(No Model.)

A. O. WILLSON.
TRACTION ENGINE.

No. 281,813. Patented July 24, 1883.

WITNESSES:
Dan Twitchell
C. Sedgwick

INVENTOR:
A. O. Willson
BY Munn & Co
ATTORNEYS.

UNITED STATES PATENT OFFICE.

ALBERT O. WILLSON, OF MADISON, GEORGIA.

TRACTION-ENGINE.

SPECIFICATION forming part of Letters Patent No. 281,813, dated July 24, 1883.

Application filed November 20, 1882. (No model.)

*To all whom it may concern:*

Be it known that I, ALBERT O. WILLSON, of Madison, in the county of Morgan and State of Georgia, have invented a new and Improved Traction-Engine, of which the following is a full, clear, and exact description.

My improvements relate to traction or road engines, the object being to provide for the application of increased power on ascending grades or otherwise when required, and also to provide for the convenient and ready turning of the engine in either direction.

To these ends my invention consists in certain features of mechanism whereby increased power can be applied to both wheels at once or to either wheel, as hereinafter described and claimed.

Reference is to be had to the accompanying drawings, forming a part of this specification, in which similar letters of reference indicate corresponding parts in all the figures.

Figure 1:
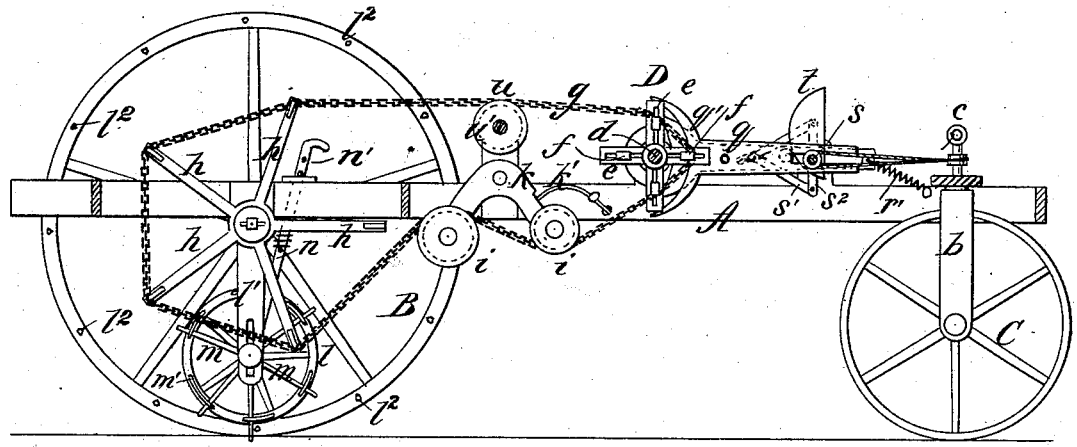
Figure 2:
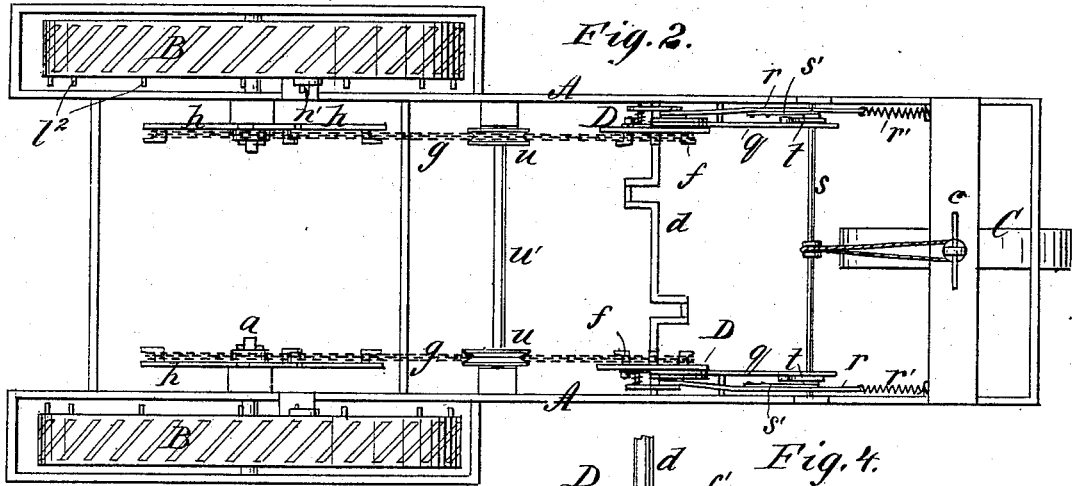
Figure 4:
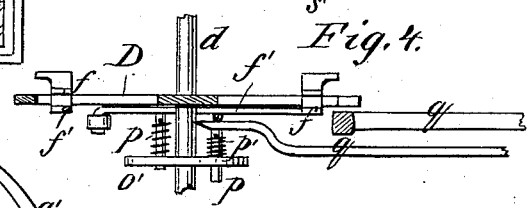
Figure 3:
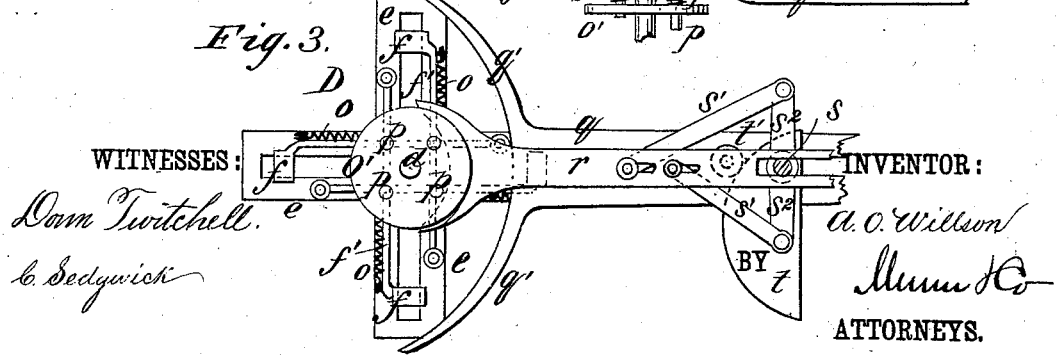

Figure 1 is a sectional side view of a road-engine of my improved construction. Fig. 2 is a plan view of the same. Fig. 3 is a side view. Fig. 4 is a sectional plan view of the clutch-wheel and mechanism in larger size.

A is the frame, supported at its rear end upon driving-wheels B B, that are fixed upon short axles $a$, and supported at its forward end by a wheel, C, which is journaled in a post, $b$, that is fitted for being turned by a handle, $c$. The boiler and engine, which are to be placed upon the frame A, are not shown, but may be of any suitable character and arrangement. At the forward part of the frame A is a crank-shaft, $d$, to which the piston or pistons of the engine or engines will be connected.

Upon the ends of the shaft $d$ are the clutch-wheels D D, consisting of four arms, $e$, projecting from the central hub, and formed with slots in which are fitted radially-moving clutches $f$, as shown most clearly in Figs. 3 and 4.

Around the clutches $f$ of the clutch-wheels chains $g$ $g$ pass to and over the ends of arms $h$, that are fixed on the axles $a$ $a$, so that when the clutch-wheels D are turned by the shaft $d$ the axles $a$ and wheels B will be revolved to propel the machine. The chains pass above and beneath tightening-wheels $i$ $i$, which are upon the ends of a pivoted frame, $k$, and a spring, $k'$, is placed to act upon the frames $k$ in a direction for tightening the chains $g$ at all times.

Within and at the lower side of each wheel B is a smaller wheel, $l$, carried by a stud in a slot of a hanger, $l'$, that projects downward from the axle $a$. This wheel $l$ is provided with radial arms or tractors $m$, pivoted at their inner ends, and held by guides $m'$ upon the rim of the wheel $l$, so that they have a limited swinging movement. These arms $m$ are for entering the ground, so as to give an increased hold to the wheel B. The arms enter the ground as they reach the under side of the wheel in front of pins $l^2$ on the rim of the wheel B, and become effective as soon as the pins $l^2$ come in contact with them. This construction allows the arms to enter the ground squarely, and to operate whether the engine is going in either one direction or the other. The wheel $l$ is pressed downward by a spiral spring, $n$, on a rod, $n'$, that is connected to the stud on which the wheel is hung. This spring allows the wheel to give way when the arms strike stones or other obstacles, and the rod $n'$ is formed at its upper end so that it can be raised for the same purpose.

For the operation of the clutches on the clutch-wheels D, for increase or decrease of the power applied to the wheels B in ascending or descending grades, and in changing the direction of movement, the mechanism is as follows: The clutches $f$ are provided with arms $f'$, to which are connected spiral springs $o$, that tend to draw the clutches inward toward the hub of the wheel. On the shaft $d$, at the side of each clutch-wheel, is a disk or cap, $o'$, fitted with sliding pins $p$, that are forced against the arms $f'$ of the clutches by spiral springs $p'$, so as to hold the clutches in the position in which they may be moved.

$q$ $q$ are slide-bars formed at their ends next to the clutch-wheels with curved spring-wings $q'$, against which the ends of the clutch-arms $f'$ move for projecting the clutches more or less, the ends of the arms being provided with friction-rollers to reduce friction.

$r$ $r$ are slide-bars projecting at the sides of the clutch-wheels, and formed at their ends for passing between the pins $p$ and the clutch-arms $f'$, so as to raise the pins from the arms;

or the slides may pass beneath heads on the pins outside the caps.

$r'$ are springs for drawing back the arms $r$ to release the pins $p$.

$s$ is a cross-shaft connected by a chain to the turning-post $c$, so as to be turned in one direction or the other, according as the post is turned, to change the direction of the machine. At the ends of the shaft $s$ are crank-arms $s^2$, connected by two links, $s'$, with the slide-bars $r$, the pins connecting the links to the slides being fitted in slots, so that a backward movement shall be given to the slides when the shaft $s$ is turned in either direction. There are also upon the shaft $s$ cams or segments $t$, placed to act upon rollers $t'$ on the slide-bars $q$, these segments or cams being placed in reverse position, so that one of them acts to move one slide $q$ back when the shaft is turned in one direction, and the other acts upon the other slide when the shaft is turned in the other direction.

In the operation of these devices, when the post $c$ is turned to change the direction of the machine, the shaft $s$ is partially rotated, and the slides $r$ at each side thereby moved back, and these slides $r$ release the pins $p$ from the clutch-arms $f'$, that are in contact with the curved wings $q'$. At the same time the slide-bar $q$ at one side of the machine is moved forward into position for projecting the clutch-arms, thereby increasing the speed by the increased radius given to the clutch-wheel. In this manner the power is decreased at the side toward which the machine is turning and increased at the opposite side.

This mechanism is also to be fitted for operation by hand independent of the steering-post $c$, so that power may be increased upon both wheels at once whenever required—as, for instance, on ascending grades. For making a very quick turn I provide the wheels $u$ $u$ on a cross-shaft, $u'$, and the chain $g$ at one side passes above the wheel $u$ at that side, and the chain at the other side passes beneath the wheel. The shaft $u'$ is to be fitted for movement to release the wheels $u$ from the chains when the engine is traveling in a straight line. When a turn is to be made, the wheels $u$ are to be moved in contact with the chain, and the clutch-wheel at one side adjusted so as to have no effect upon the chain at that side, and power being thus applied entirely to one chain, the chain at the opposite side will be moved in the reverse direction, and consequently the driving-wheel at that side will be reversed. In this manner the machine may be turned almost upon its own center.

It will be understood that the position of the slide $q$ and its wings $q'$ determines and regulates the position of the clutches $f$ at all times, and thereby the power applied to the wheels B, and by adjustment of the clutches the power can be varied without changing the stroke of the piston.

Having thus fully described my invention, I claim as new and desire to secure by Letters Patent—

1. In traction-engines, the combination of the driving-shaft $d$, the clutch-wheels D, provided with adjustable clutches $f$, the driving-wheels B, the chains $g$, and arms $h$ on the axles of the driving-wheels, substantially as shown and described.

2. In traction-engines, the combination, with the driving-shaft, of the clutch-wheels D, provided with adjustable clutches $f$, and carrying the driving-chains, substantially as described.

3. In traction-engines, the combination of the pivoted frames $k$ and tightening-wheels $i$ $i$ with the driving-chains $g$, substantially as and for the purpose set forth.

4. In traction-engines, the combination, with the traction-wheel $l$, journaled adjustably in hangers $l'$, of the rod $n'$, having a spring, $n$, acting upon the axle of the wheel $l$, substantially as and for the purpose set forth.

5. The shaft $u'$ and chain-wheels $u$, combined with the driving-chains $g$, pulleys $i$, and arms $h$, and clutch-wheels D, substantially as and for the purpose set forth.

6. In traction-engines, the combination, with the clutch-wheels D, provided with sliding clutches $f$, having arms $f'$, of slide-bars $q$, curved wings $q'$, and holding-pins $p$, substantially as shown and described.

7. In traction-engines, the slide-bars $q$, formed with wings $q'$, and the slide $r$, combined with the clutch-wheels D, provided with sliding clutches $f$ and holding-pins $p$, substantially as shown and described.

8. In traction-engines, the combination of the shaft $s$, the crank-arms $s^2$, and the links $s'$ with the slide $r$, substantially as shown and described.

9. In traction-engines, the combination of the shaft $s$ and cams $t$ with the slide-bars $q$, provided with rollers $t'$, substantially as and for the purpose set forth.

10. In traction-engines, the combination of the steering-post $c$, the shaft $s$, fitted for movement by the steering-post, the clutch-wheels D, and mechanism, substantially as described, for expanding the clutches by the movement of the shaft $s$, for the purpose set forth.

ALBERT O. WILLSON.

Witnesses:
E. A. FURLOW,
W. A. TOLAR.